Aug. 22, 1967 W. W. WAHLGREN 3,337,818
MODULATION SYSTEM WITH MULTIPLE MODULATION OUTPUTS
Filed May 18, 1964
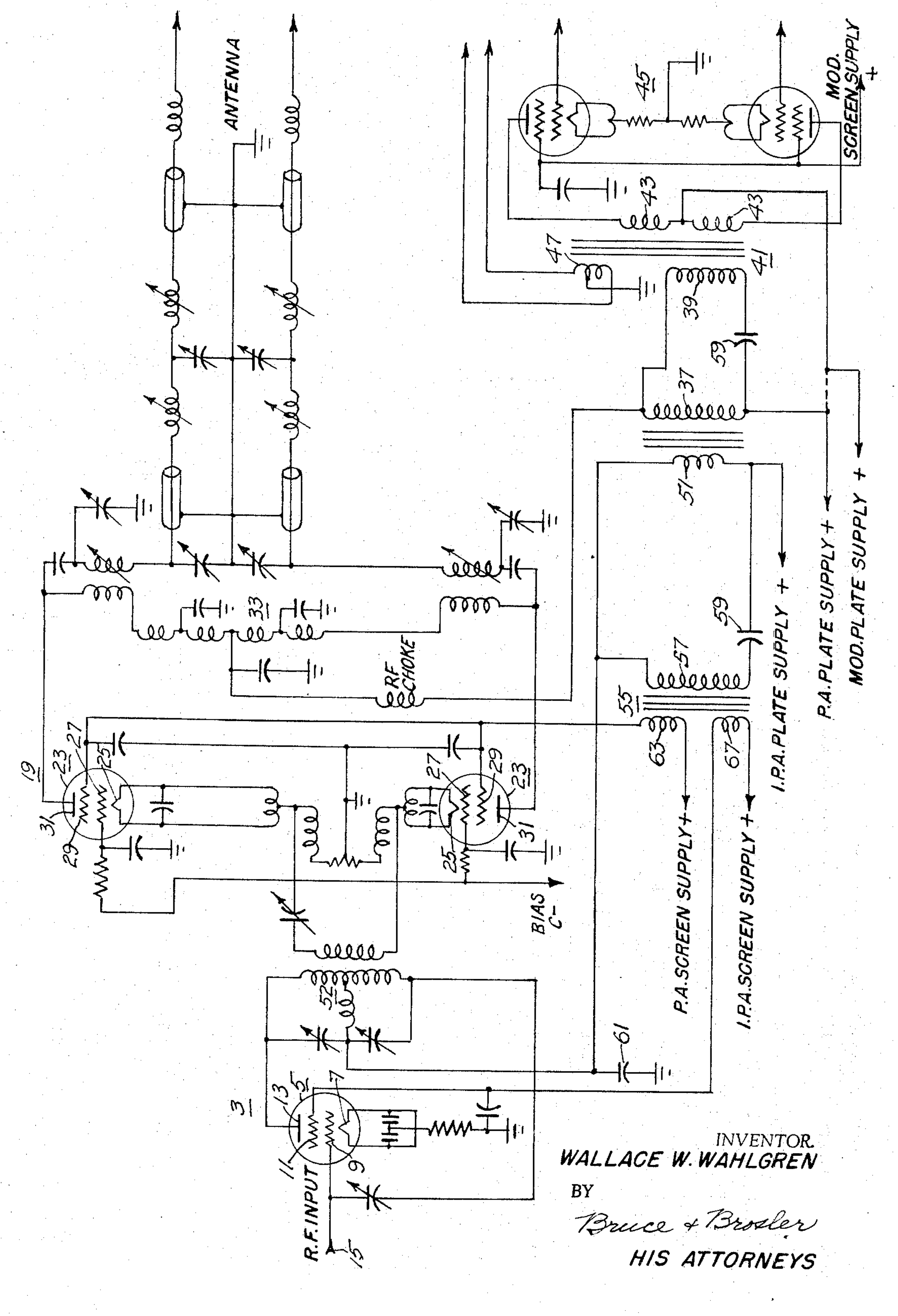
INVENTOR.
WALLACE W. WAHLGREN
BY
Bruce + Brosler
HIS ATTORNEYS 3,337,818
MODULATION SYSTEM WITH MULTIPLE MODULATION OUTPUTS Wallace W. Wahlgren, Oakland, Calif., assignor, by mesne assignments, to The Rucker Company, Oakland, Calif.

Filed May 18, 1964, Ser. No. 368,268
9 Claims. (Cl. 332—41)

My invention relates to amplitude modulation of high frequency energy, and more particularly to a modulation system in which modulation occurs at more than one point in the system.

In recent years, with the advent of successful high powered tetrode and pentode vacuum tubes, there has been an increasing desire on the part of manufacturers of amplitude modulated transmitters, to be able to successfully modulate at more than one point in the radio frequency power amplifiers in addition to the usual plate modulation. It is considered desirable by many designers to modulate the screen of the final power amplifier, and quite often, in addition, the plate and screen of the intermediate stage of amplification as well.

In other cases, it is considered desirable to operate the final radio frequency amplifier with either the screen grounded or the grid grounded. When this is done, there is usually a requirement of more than one output of the audio system, coupling it to the radio frequency amplifier.

The above factors become of prime importance in the manufacture of higher powered transmitters now ranging well above 100 kilowatt output. In fact, transmitters are now being built having outputs as high as 1,000 kilowatts, and there will probably be incentives to even exceed these power requirements. When one considers that the power bill for a broadcast transmitting station is based upon a consumption of approximately two and one-half times the transmitted power, one can readily realize that the power bill itself is an important factor in the cost of operating a high powered transmitter.

The basic transmitter of today, modulates the plate of the final radio frequency or power amplifier. Almost invariably, this requires the use in high power or high grade transmitters, of a modulation transformer having a single output voltage, perhaps with some minor taps for voltage adjustment, and in connection with a modulation reactor which carries the direct current to the plate of the final amplifier, without short circuiting the output of the final modulated tubes.

The present invention is of particular use when incorporated in what is known as high level amplitude modulated transmitters, wherein there are two amplifier systems, one an audio system, and one a radio frequency system.

An audio frequency amplifier system takes the minute signal from microphones or phonograph pickups, tape heads and the like, and amplifies them to a power level of approximately one-half the rated transmitter output in watts. The final tubes in this series of amplifiers are called the modulator tubes, and currently are either high powered triodes or tetrodes.

The radio frequency amplifier system includes a source of high frequency in the form of an oscillator circuit, the frequency of which is that assigned to the transmitter, and this high frequency is amplified through a series of amplifier circuits including the final radio frequency stage known as the final power amplifier. The final amplifier stage is coupled through a tuned tank circuit to the antenna, and the power derived from the amplifier is radiated by the antenna at the specific radio frequency of the oscillator.

In order to transmit intelligence, sound and music over this antenna, it is necessary to modulate this radio frequency energy, and this is accomplished by taking the power from the modulator tubes and coupling through matching transformers and reactors and capacitors, into the output circuit of the radio frequency power amplifier stage, so that the radio frequency power increases and decreases in accordance with the audio signals thus supplied.

The usual arrangement involves coupling the modulator tubes to the final radio frequency amplifier stage by means of a modulation transformer, and a modulation reactor, together with a blocking capacitor, to keep the direct current from the secondary winding of the modulation transformer.

When several audio frequency modulation outputs are required from the modulator system to the radio frequency system, the most common arrangement requires that the bulk of the audio power, usually in excess of 90% thereof, will still be employed in the conventional manner, and will modulate the plate of the final radio frequency amplifier, while the remaining less than 10% of the audio power will be apportioned to the various outputs employed.

Such audio power, if applied in accordance with the customary logical approach, is derived from additional secondary windings added to the modulation transformer. Each of the various secondary windings will have its own power level and voltage level.

For a multiple modulation output system to function properly, the signal voltages coming out of these secondary windings must be exactly in step, or in electrical terms, there must be no phase shift of any consequence, as otherwise the corresponding signals will not pull together and function properly. Also, all such secondary windings must have the same frequency response and distortion characteristics, or in other words, the frequency pass band characteristics of all of the secondary windings must be essentially identical.

Accordingly, each secondary winding on the transformer should have a precise set of parameters, including mutual coupling, leakage inductance, capacitance, impedance, resistance . . . etc., and of course all of these are related to the same primary winding or windings. The problem is rendered doubly difficult, because conventional modulation circuits almost always employ a Class B or Class AB type modulator, wherein two primary windings are utilized, which function alternately, and thus the secondary windings must be coupled to both of the primary windings in a similar if not identical manner.

The problem is also intensified because the impedance and voltage level of the principal winding is generally at high voltage, whereas the auxiliary windings are of low impedance and low voltage, and having a relatively high capacitance to ground. When attempts are made to interwind these secondary windings with each other so that they will all have the same average relationship with the primary windings, then one encounters a serious problem of capacitance loading among the secondary windings, that is to say, the low impedance small windings will place a virtual ground potential adjacent to the high voltage winding, and hence by reason of the capacitance coupling which is inevitable with any inductive coupling, a severe overloading, capacitively, occurs at the high frequency end of the frequency range.

For the reasons above noted, it is very difficult to arrange a transformer employing multiple secondary windings as well as primary windings all demanding equal treatment with the others. Under these conditions, a satisfactory solution is prohibitive or at least exceedingly difficult.

Among the objects of my invention are:

(1) To provide a novel and improved multiple output modulation system;

(2) To provide a novel and improved multiple output modulation system which is not too critical in its requirement of engineering design, and will function more efficiently;

(3) To provide a novel and improved multiple output modulation system which, in addition to the foregoing, may be manufactured more economically.

Additional objects of my invention will be brought out in the following description of a preferred embodiment of the same, taken in conjunction with the accompanying drawing, wherein the view depicts a modulation system embodying the multiple output modulation feature characterizing the present invention.

Referring to the drawing for details of my invention in its preferred form, a two-stage radio frequency amplifier is depicted as feeding energy to an antenna, such two-stage amplifier including an intermediate power amplifier 3 employing a tetrode 5 involving cathode 7, grid 9, screen grid 11 and plate 13 electrodes, with a radio frequency source 15 supplying the grid of the tube.

The second or power amplifier stage 19 is of the push-pull type, employing a pair of tetrode tubes 23, each likewise having cathode 25, control grid 27, screen grid 29, and anode 31 electrodes.

The output circuit 33 of the power amplifier is modulated in the conventional manner by a modulator reactor 37 in the direct current supply circuit to the anodes 31 of the power amplifier, the reactor being connected across the secondary 39 of a modulating transformer 41 having primary windings 43 in the output of an audio push-pull Class B modulated amplifier stage 45. A feed back winding 47 coupled to the primary windings 43 of the audio amplifier stage, serves to feed back energy to an earlier audio stage for correction purposes.

The details of the radio frequency intermediate power amplifier and power amplifier, and the coupling of the output of the power amplifier to the antenna are, except for the modulation features of the present invention, conventional and need not be described in detail.

Insofar as the application of the present invention thereto is concerned, modulation, in addition to the conventional modulation in the plate circuits of the power amplifier, is to be effected in the screen grid circuit of both the intermediate power amplifier and the power amplifier, as well as the plate circuit of the intermediate power amplifier. The DC voltage requirements of all of these circuits being quite different, constitutes an important factor to be considered in the solution of the problem at hand.

Accordingly, toward accomplishing the objects of the present invention, I have found that a secondary winding 51 placed on the modulation reactor 37, would have very excellent characteristics and very minimal phase shift, and a very minimum of capacitance loading, if the power absorbed by this secondary winding from the reactor, was but a small percentage of the total power supplied to such reactor. Inasmuch as any modulation outputs added to the conventional modulation system, would require less than 10% of the total audio modulation power requirements of the system, it follows that such a winding added to the modulation reactor to handle such small percentage of the total power, would satisfy the requirements for modulating at least one, and additional other circuits in the radio frequency stages.

Such secondary winding 51 is accordingly included in series with the DC voltage supply to the plate 13 of the intermediate power amplifier 3, whereby the radio frequency power in the output circuit 52 of the intermediate power amplifier will be modulated in synchronism with the modulation occurring in the output circuit 33 of the power amplifier. With the reactor winding 37, it forms a step-down transformer, and one preferably having a turns ratio of 3 or more to 1.

Secondary winding 51 thus becomes a low impedance power source having a relatively high capacitance to ground and hence not sensitive to other low impedance loads coupled to it. Thus it can be used to deliver additional power, as from a stiff or relatively unlimited power source having a low internal impedance.

For example, if the secondary winding 51 has an induced voltage equal to one-tenth of the principle voltage of winding 37, the impedance ratio would be $(1/10)^2$ or 1/100. So if the impedance of the principal circuit was 1000 ohms, then the impedance of the secondary 51 would be 10 ohms which remains 10 ohms regardless of the impedance of a load placed across the secondary winding.

It so happens that when the power level is 1/10 of the principal power, that the load impedance may be on the order of several hundred or a few thousand ohms. Thus a load resistance of say 500 ohms placed across the secondary winding 51 would be looking into a very low source impedance of 10 ohms. This condition makes it possible to make coupling transformers inexpensively, yet having excellent band pass electrical characteristics. One or more transformers could be supplied from this source within the limits of the power capability of winding 51.

One should note that when we have a winding with a low impedance such as 10 ohms, a relatively large capacitance can be placed across it without serious effect.

For example it takes a 0.100 mfd. capacitor across the secondary 51 to have the same effect as a 0.001 mfd. capacitor across the winding 37. Inasmuch as capacitance values normally used would not even approach 0.10 mfd. we can see that capacitance loading is not a problem.

Accordingly, should one desire to add an additional modulation output in the radio frequency system of the transmitter, a modulation transformer 55 may be employed by connecting its primary winding 57 across the reactor secondary winding 51 through a DC blocking condenser 59, and preferably grounding one side of the primary winding 57 through a radio frequency by-pass condenser 61.

The transformer 55 includes a secondary winding 63 which may then be connected in series with the DC power supply to the screen grid 29 of the power amplifier 19, whereby modulation at this point in the system would also be realized.

It is important in this connection, to note that the transformer 55 in question, is not electromagnetically coupled to the reactor winding 37 or its associated secondary winding 51, and is thereby free of any adverse influences which such type of coupling could bring about.

An additional modulation output may be derived from this transformer 55 by adding an additional secondary winding 67, to be included, for example, in series with the DC power supply to the screen grid 11 of the tube 5 in the intermediate power amplifier stage.

The efficacy of the present invention is thus predicated upon two important relationships, namely (1) applicant's discovery that a secondary winding on the reactor, handling under 10% of the total audio modulating power, can be advantageously employed to modulate at another point in the radio frequency system without adversely affecting the quality of the modulation output, and (2) by diverting some of this power from the reactor secondary winding through a transformer having no electromagnetic coupling with such secondary winding, additional modulation outputs can be advantageously created for modulating at other points in the radio frequency system, where lower power requirements are in order.

It will be appreciated that while I have illustrated and described my invention in its preferred form, that the same is subject to alteration and modification without departing from the underlying principles involved, and I accordingly do not desire to be limited in my protection to the specific details illustrated and described, except as may be necessitated by the appended claims.

I claim:

1. A multiple output circuit in a wide frequency band system where multiple outputs of the modulating frequencies at various power levels are required, said multiple output circuit comprising a modulation reactor involving a core and a main winding thereon, means for supplying modulating power to said reactor, means for deriving from said reactor, on the order of 90 percent of said power, and means for deriving the balance of modulating power from said reactor, said means including a second winding on said reactor core intimately coupled magnetically to said reactor main winding, said reactor winding and said second winding having a step down turns ratio of the order of three to one, and providing for a power transfer of the order of 10% and less, an auxiliary modulation transformer having a primary winding and at least one secondary winding, and means coupling said primary winding to said reactor second winding as a source of modulating power, with said transformer primary winding substantially free of magnetic linkage to said reactor second winding.

2. A multiple output circuit in a wide frequency band system where multiple outputs of the modulating frequencies at vartious power levels are required, said multiple output circuit comprising a modulating reactor involving a core and a main winding thereon, means for supplying modulating power to said reactor, means for deriving from said reactor, on the order of 90 percent of said power, and means for deriving the balance of modulating power from said reactor, said means including a second winding on said reactor core intimately coupled magnetically to said reactor main winding, said reactor winding and said second winding having a step down turns ratio of the order of three to one, and providing for a power transfer of the order of 10% and less, an auxiliary modulation transformer having a primary winding and at least one secondary winding, means coupling said primary winding to said reactor second winding as a source of modulating power, with said transformer primary winding substantially free of magnetic linkage to said reactor second winding, and separate modulation load means of decreasing power requirements connected respectively to said reactor winding, reactor second winding, and transformer secondary winding.

3. A multiple output circuit in a wide frequency band system where multiple outputs of the modulating frequencies at various power levels are required, said multiple output circuit comprising a modulation reactor involving a core and a main winding thereon, means for deriving from said reactor, on the order of 90 percent of said power, means for supplying modulating power to said reactor, and means for deriving the balance of modulating power from said reactor, said means including a second winding on said reactor core intimately coupled magnetically to said reactor main winding for carrying but a fraction of the power requirement of said reactor, on the order of 10 percent and less, an auxiliary modulation transformer having a primary winding and at least one secondary winding, means coupling said primary winding across said reactor second winding as a source of modulating power, with said transformer primary winding substantially free of magnetic linkage to said reactor second winding, and separate modulation load means of decreasing power requirements connected respectively to said reactor winding, reactor second winding, and transformer secondary winding.

4. A multiple output circuit in a wide frequency band system where multiple outputs of the modulating frequencies at various power levels are required, said multiple output circuit comprising a modulation source terminating in a main modulation transformer including push-pull primary windings and a secondary winding, a modulation reactor involving a core and a main winding thereon connected in the output of said secondary winding, and means for deriving fractional amounts of modulating power from said reactor, said means including a second winding on said reactor core intimately coupled magnetically to said reactor main winding with a step-down turns ratio of the order of three to one for carrying but a fraction of the power requirement of said reactor, on the order of ten percent and less, and separate modulation load means connected to each of said reactor winding and reactor second winding.

5. A multiple output modulation system comprising a source of carrier frequency, means for amplifying power at said carrier frequency, said means involving application of differing values of impressed DC voltage at various points therein, and means for modulating said carrier frequency power at such various points of different DC voltage application, said means including a main modulation transformer having push-pull primary windings and a secondary winding, a modulation reactor across the output of said secondary winding in circuit with one such value of DC voltage, said modulation reactor involving a core and a main winding on said core having the capacity to carry the power requirement of said circuit, a secondary winding on said modulation reactor intimately coupled magnetically to said main winding, and of substantially lower number of turns than said main winding, means connecting said reactor secondary winding in circuit with a DC voltage of lower value than that associated with said reactor main winding, an auxiliary step-down transformer comprising a primary winding and a secondary winding, means coupling said auxiliary transformer primary winding to said reactor secondary winding for receiving modulating current flow, said windings being essentially free of magnetic linkage between them, and means connecting the secondary winding of said auxiliary transformer in circuit with a lower value of DC voltage in said carrier frequency power amplifying means than that DC voltage in circuit with said modulation reactor secondary winding.

6. A multiple output modulation system comprising a source of carrier frequency, means for amplifying power at said carrier frequency, said means involving application of differing values of impressed DC voltage at various points therein, and means for modulating said carrier frequency power at such various points of different DC voltage application, said means including a modulation reactor in circuit with one such value of DC voltage, said reactor involving a core and a main winding on said core having the capacity to carry the power requirement of said circuit, a secondary winding on said modulation reactor intimately coupled magnetically to said main winding, the ratio of turns of said primary winding to said secondary winding being greater than one, means connecting said reactor secondary winding in circuit with a DC voltage of lower value than that associated with said reactor main winding, an auxiliary step-down transformer comprising a primary winding and a secondary winding, means coupling said auxiliary transformer primary winding to said reactor secondary winding for receiving modulating current flow, said windings being essentially free of magnetic linkage between them, and means connecting the secondary winding of said auxiliary transformer in circuit with a lower value of DC voltage in said carrier frequency power amplifying means than that DC voltage in circuit with said reactor secondary winding.

7. A multiple output modulation system comprising a source of carrier frequency, means for amplifying power at said carrier frequency, said means involving application of differing values of DC voltage at various points therein, and means for modulating said carrier frequency power at such various points of different DC voltage application to provide a plurality of modulating circuits, said means including a modulation reactor in circuit with the DC voltage of maximum value, said modulation reactor involving a core and a main winding on said core having the capacity to carry the power requirement of said circuit, a secondary winding on said modulation reactor intimately coupled to said main winding, the ratio of turns of said main winding, to said secondary winding being greater than one, means connecting said reactor secondary winding in a modulating circuit having a DC voltage of lower value than that associated with said reactor primary winding, an auxiliary step-down transformer comprising a primary winding and a plurality of secondary windings, means coupling said auxiliary transformer primary winding across the output of said reactor secondary winding for receiving modulating current flow from said reactor secondary winding, said windings being essentially free of magnetic linkage between them, means connecting one of said auxiliary transformer secondary windings in a modulating circuit having a lower value of DC voltage in a modulating said carrier frequency power amplifying means than that DC voltage in circuit with said reactor secondary winding, and means connecting another of said auxiliary transformer secondary windings in circuit with a lower value of DC voltage in said carrier frequency powed amplifying means than that DC voltage in circuit with said first auxiliary transformer secondary winding.

8. A multiple output modulation system comprising a source of carrier frequency, means for amplifying power at said carrier frequency, said means involving application of differing values of DC voltage at various points therein, and means for modulating said carrier frequency power at such various points of different DC voltage application, said last means including a power modulation reactor in circuit with the DC voltage of maximum value, said reactor involving a core and a main winding on said core having the capacity to carry the power requirement of said circuit, a secondary winding on said modulation reactor intimately coupled to said main winding, the ratio of turns of said main winding to said secondary winding being greater than one, means connecting said modulation reactor secondary winding in circuit with a DC voltage of lower value than that associated with said reactor main winding, an auxiliary step-down transformer comprising a primary winding and a plurality of secondary windings of different number of turns, means coupling said auxiliary transformer primary winding to said reactor secondary winding for receiving modulating current flow from said reactor secondary winding, said windings being essentially free of magnetic linkage between them, means connecting the auxiliary transformer secondary winding of greater number of turns in series with a lower value of DC voltage in said carrier frequency power amplifying means than that DC voltage in circuit with said reactor secondary winding, and means connecting the auxiliary transformer secondary winding of next lower number of turns in series with a lower value of DC voltage in said carrier frequency power amplifying means than that DC voltage in circuit with said first auxiliary transformer secondary winding.

9. A multiple output means for a wide frequency band system where multiple outputs at various power levels are required, said multiple outputs means comprising a modulation reactor involving a core and a main winding thereon, a main power take-off connection from said main winding, and means for deriving substantially less power from said reactor, said means including a second winding on said reactor core for carrying but a fraction of the power requirement of said reactor, on the order of 10 percent and less, and intimately coupled magnetically to said reactor main winding, an auxiliary transformer having a primary winding and a secondary winding, means coupling said primary winding to said reactor second winding as a source of modulating power, with said auxiliary transformer primary winding substantially free of magnetic linnkage to said reactor second winding, and means connected to each of said reactor main winding, reactor second winding, and transformer secondary winding for supplying modulating power to separate modulating circuits of decreasing DC voltage values.

References Cited

UNITED STATES PATENTS

| | | | |
|---|---|---|---|
| 2,463,275 | 3/1949 | Henderson | 332—41 |
| 3,007,118 | 10/1961 | Steel | 332—29 |

ROY LAKE, *Primary Examiner.*

ALFRED L. BRODY, *Examiner.*